United States Patent
Shen et al.

(10) Patent No.: US 7,861,026 B2
(45) Date of Patent: Dec. 28, 2010

(54) SIGNAL RELAY DEVICE AND METHOD FOR ACCESSING AN EXTERNAL MEMORY VIA THE SIGNAL RELAY DEVICE

(75) Inventors: Yu-Chen Shen, Taipei Hsien (TW);
Yi-Shin Li, Taipei Hsien (TW);
Ming-Chung Hsu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 63 days.

(21) Appl. No.: 12/417,646

(22) Filed: Apr. 3, 2009

(65) Prior Publication Data

US 2010/0011141 A1  Jan. 14, 2010

(30) Foreign Application Priority Data

Jul. 11, 2008  (CN) .................. 2008 1 0302704

(51) Int. Cl.
*G06F 13/36* (2006.01)
(52) U.S. Cl. ..................... 710/309; 710/113
(58) Field of Classification Search ......... 710/305–317, 710/113, 242
See application file for complete search history.

(56) References Cited

U.S. PATENT DOCUMENTS

| | | | | |
|---|---|---|---|---|
| 5,379,386 A | * | 1/1995 | Swarts et al. ................ 710/310 |
| 5,487,152 A | * | 1/1996 | Young ........................ 709/236 |
| 5,634,139 A | * | 5/1997 | Takita ......................... 710/35 |
| 5,758,089 A | * | 5/1998 | Gentry et al. ............... 709/234 |
| 5,809,280 A | * | 9/1998 | Chard et al. ................ 711/160 |
| 5,966,724 A | * | 10/1999 | Ryan ........................ 711/105 |
| 5,970,069 A | * | 10/1999 | Kumar et al. ............... 370/402 |
| 5,999,999 A | * | 12/1999 | Homitsu et al. ............ 710/307 |
| 6,081,860 A | * | 6/2000 | Bridges et al. .............. 710/110 |
| 6,247,084 B1 | * | 6/2001 | Apostol et al. ............. 710/108 |
| 6,430,661 B1 | * | 8/2002 | Larson et al. ............... 711/158 |
| 6,560,667 B1 | * | 5/2003 | Wolrich et al. ............. 710/310 |
| 6,587,905 B1 | * | 7/2003 | Correale et al. ............ 710/107 |
| 6,601,126 B1 | * | 7/2003 | Zaidi et al. ................. 710/305 |
| 6,934,780 B2 | * | 8/2005 | Modelski et al. ........... 710/100 |
| 7,038,737 B1 | * | 5/2006 | Kohashi et al. ............. 348/718 |
| 7,486,688 B2 | * | 2/2009 | Barrack et al. ............. 370/412 |
| 2002/0178310 A1 | * | 11/2002 | Nozaki ....................... 710/240 |
| 2004/0015617 A1 | * | 1/2004 | Sangha et al. .............. 710/10 |

* cited by examiner

*Primary Examiner*—Paul R Myers
(74) *Attorney, Agent, or Firm*—Frank R. Niranjan

(57) ABSTRACT

A signal relay device for accessing an external memory is provided. The signal relay device includes a bus arbiter and a burst access engine. The bus arbiter performs bus arbitration among main masters on a bus. The burst access engine exchanges signals with the bus arbiter and an external memory controller. The signal relay device facilitates data transfer of large groups of read/write commands between the main masters and the external memory controller.

20 Claims, 4 Drawing Sheets

SIGNAL RELAY DEVICE AND METHOD FOR ACCESSING AN EXTERNAL MEMORY VIA THE SIGNAL RELAY DEVICE

BACKGROUND

1. Technical Field

Embodiments of the present disclosure are related to signal transmission, and more particularly to a signal relay device and a method for accessing an external memory via the signal relay device.

2. Description of Related Art

External memory systems, such as hard disks, floppy disks, optical disks, and others, allow permanent storage of large quantities of data. However, a central processing unit (CPU) can only directly access data that is in main memory. To process data in an external memory, the CPU must first transfer the data to the main memory. An external memory controller is often used for completing the data transfer between the external memory and the main memory. However, the external memory controller can only send one command, that is, one read or write command, to the external memory at one time, with the subsequent command waiting for completion of the current command. As a result, considerable time is spent on the data transfer when numerous commands are required, and bandwidth of the external memory is not fully utilized.

DETAILED DESCRIPTION

Figure 1:
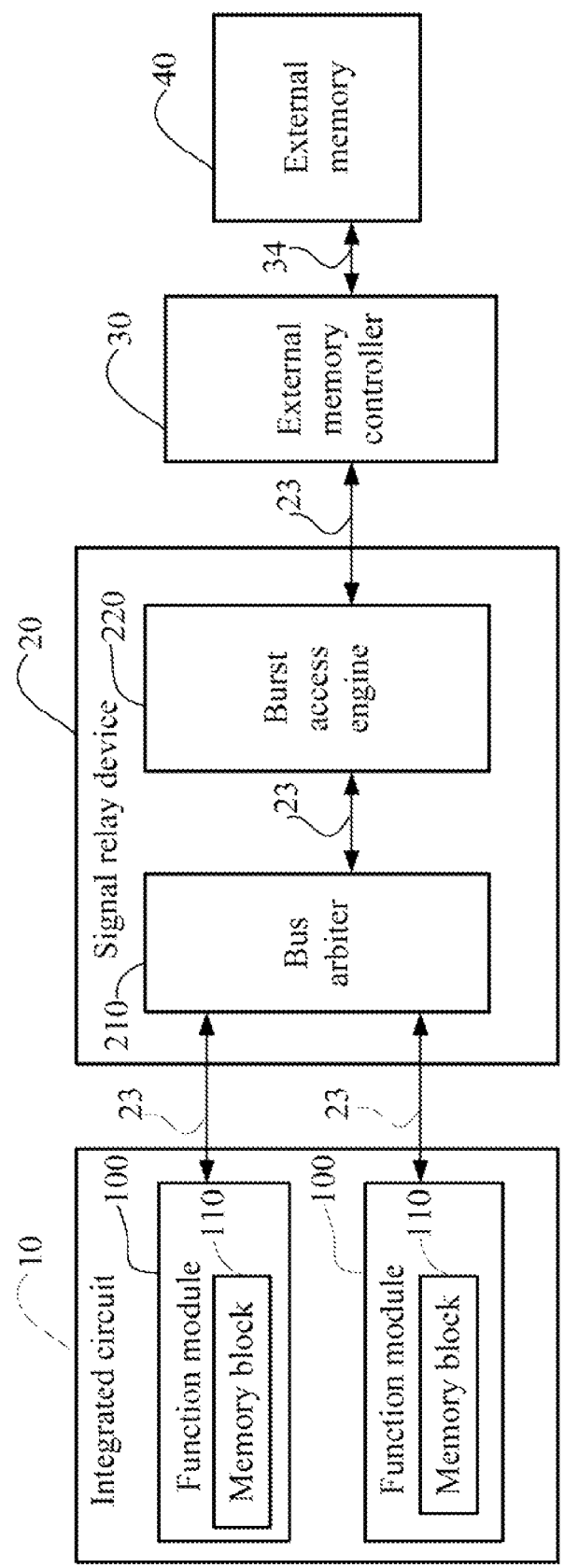
FIG. 1 is a block diagram of one embodiment of an application environment of a signal relay device.

FIG. 1 is a block diagram of one embodiment of an application environment of a signal relay device 20. The signal relay device 20 connects one or more main devices, such as an integrated circuit (IC) 10, to one or more secondary devices, such as an external memory controller 30, via a bus 23. The external memory controller 30 is further connected to an external memory 40 via a data bus 34. In one embodiment, the IC 10 may be a processor, an audio device, a video device, or any other CPU-driven device. The external memory 40 may be a hard disk, a floppy disk, or an optical disk, such as a compact disk (CD).

In one embodiment, the IC 10 includes one or more function modules 100, which read data from or write data to the external memory 40, for performing particular tasks. The IC 10 further includes a plurality of memory blocks 110 for storing data. Depending on the embodiment, as shown in FIG. 1, the memory blocks 110 may be internal components of the function modules 100, or be external components corresponding to the function modules 100.

The signal relay device 20 includes a bus arbiter 210 and a burst access engine 220 connected to the bus arbiter 210 via the bus 23. The bus arbiter 210 performs bus arbitration among the function modules 110 on the bus 23. Depending on the embodiment, any one function module 110 hosting the bus 23 may issue consecutive read/write commands to the external memory 40 via the burst access engine 220, to fully utilize the bandwidth of the external memory 40.

Figure 2:
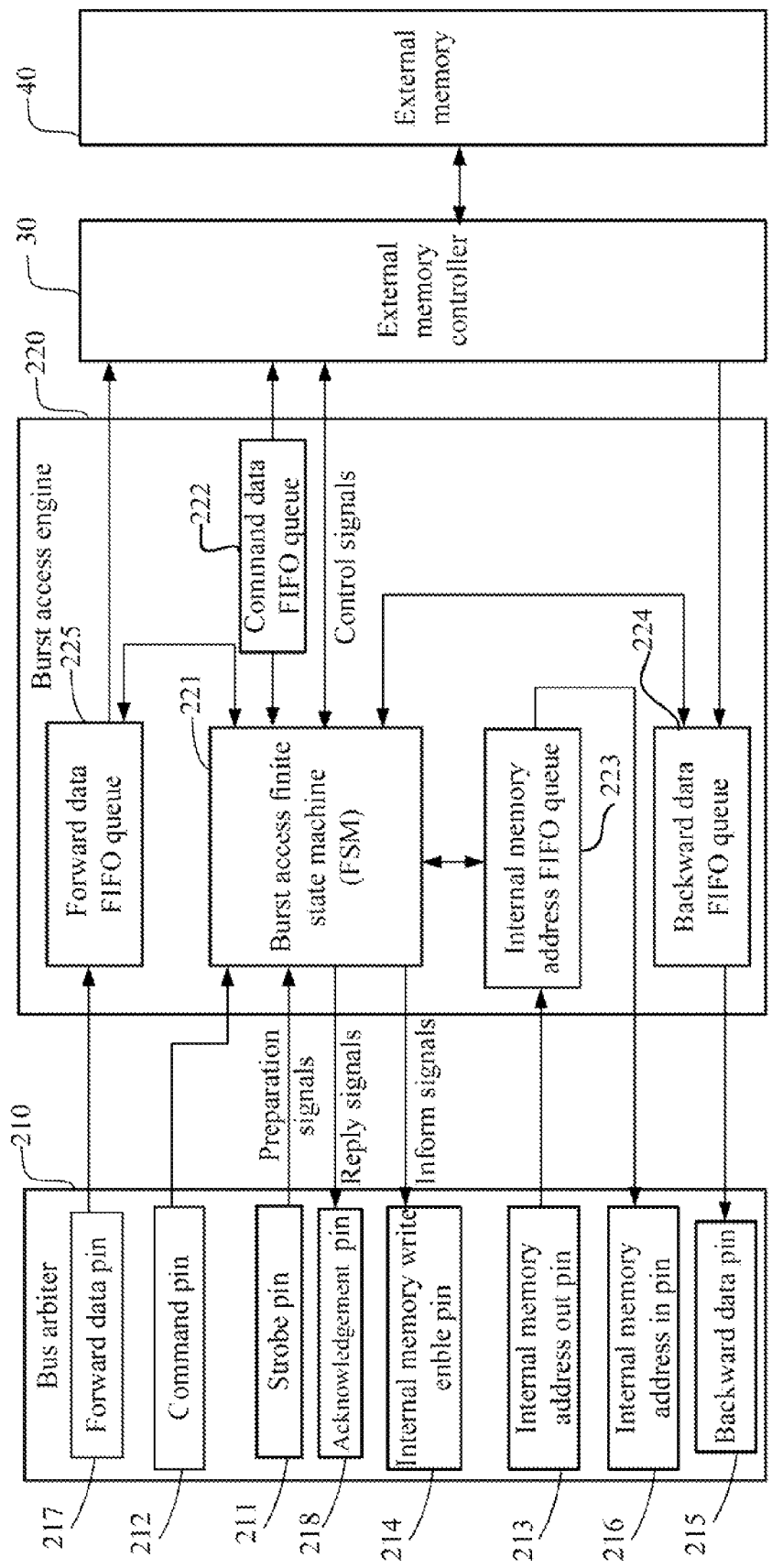
FIG. 2 is a block diagram of one embodiment of the signal relay device in FIG. 1.

FIG. 2 is a block diagram of one embodiment of the bus arbiter 210 and the burst access engine 220. As mentioned above, the function module 110 sends read/write commands to the bus arbiter 210 along the bus 23. The burst access engine 220 analyzes and processes the read/write commands, sends the read/write commands to the external memory controller 30, receives feedback information from the external memory controller 30, and sends the feedback information to the function module 110.

In one embodiment, the bus arbiter 210 includes a plurality of pins for executing one or more operations of the bus arbiter 210, i.e., a strobe pin 211, a command pin 212, an internal memory address out pin 213, an internal memory write enable pin 214, a backward data pin 215, an internal memory address in pin 216, a forward data pin 217, and an acknowledgement pin 218. The burst access engine 220 includes a burst access finite state machine (FSM) 221, a command data first in first out (FIFO) queue 222, an internal memory address FIFO queue 223, a backward data FIFO 224, and a forward data FIFO 225.

The strobe pin 211 is configured for sending a preparation signal to the burst access FSM 221, to inform the external memory controller 30 of an operation requested by the function module 110. The operation may be read data from or write data to the external memory 40.

The command pin 212 is configured for sending a command signal about the operation to the burst access FSM 221. In one embodiment, the command signal includes an operation type, one or more commands, and a communication address of the external memory 40. The command signal may include only one command, or include a plurality of commands. For example, the command signal "'set length=100' & 'read'" may indicate the presence of one hundred consecutive read commands. The burst access FSM 221 stores the commands into the command data FIFO queue 222.

The internal memory address out pin 213 is configured for sending an internal memory address signal corresponding to the command signal to the burst access FSM 221. In one embodiment, the internal memory address signal includes internal memory address information of the IC 10, such as a memory block 110 to which the read data is stored or from which the writing data is read. Depending on the amount of commands included in the command signal, the internal memory address signal may target a specific address in the memory block 110, or a begin address in the memory block 110. For example, if the command signal only includes one read command, a corresponding internal memory address signal of "addr_[a]" targets a specific address in the memory block 110 for storing data obtained according to the read command. In another example, if the command signal includes a plurality of consecutive read commands, such as "'set length=100' & 'read'," the internal memory address signal of "addr_[a]" targets a begin address in the memory block 110 for storing data obtained according to the plurality of consecutive read commands. The burst access FSM 221 stores the internal memory address information into the internal memory address FIFO queue 223.

The burst access FSM 221 directs the external memory controller 30 to read first data from the external memory 40 according to the commands in the command data FIFO queue 222, and stores the first data into the backward data FIFO queue 224. The external memory controller 30 sends a control signal to direct the burst access FSM 221 to prepare writing of the first data to the memory block 110 in the IC 10. After receiving the control signal, the burst access FSM 221 transmits an inform signal to the internal memory write enable pin 214. It is noted that, if the operation type included in the command signal is "writing data," no inform signal will be sent by the burst access FSM 221. Upon the condition of receiving the inform signal by the internal memory write enable pin 214, the backward data pin 215 receives the first data from the backward data FIFO queue 224, and the internal memory address in pin 216 writes the first data to a corresponding address in the memory block 110.

The internal memory address in pin 216 is configured for reading second data from a corresponding address in the memory block 110, according to the internal memory address information into the internal memory address FIFO queue 223. The forward data pin 217 is configured for storing the second data into the forward data FIFO queue 225. The burst access FSM 221 writes the second data stored in the data FIFO queue 225 to the external memory 40, according to the commands stored in the command data FIFO queue 222 via the external memory controller 30. The acknowledgement pin 218 is configured for receiving a reply signal sent by the burst access FSM 221 after the burst access FSM 221 has completed reading or writing operations to the external memory 40.

Figure 3A:
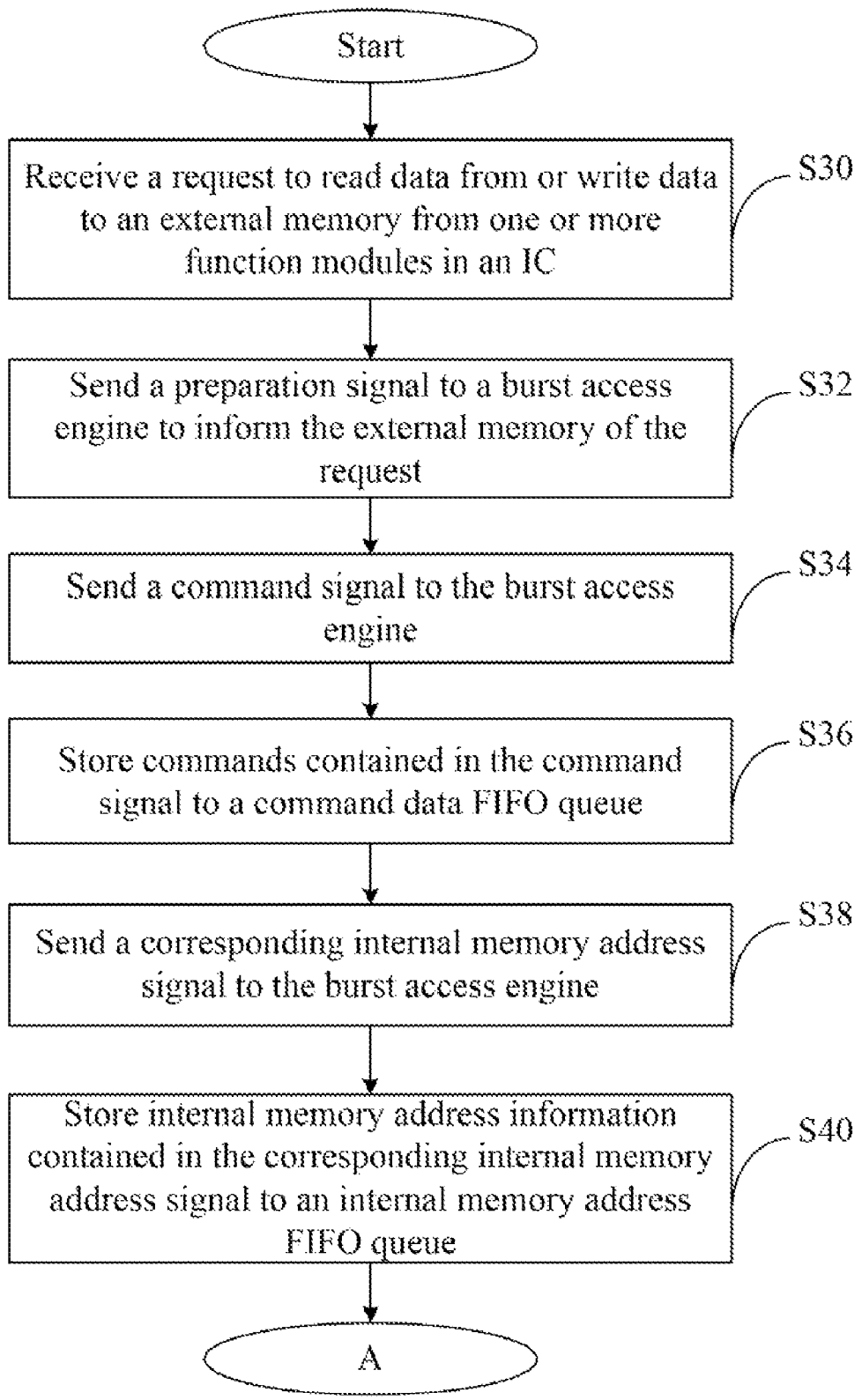
FIG. 3A and FIG. 3B are flowcharts of one embodiment of an external memory access method.
Figure 3B:
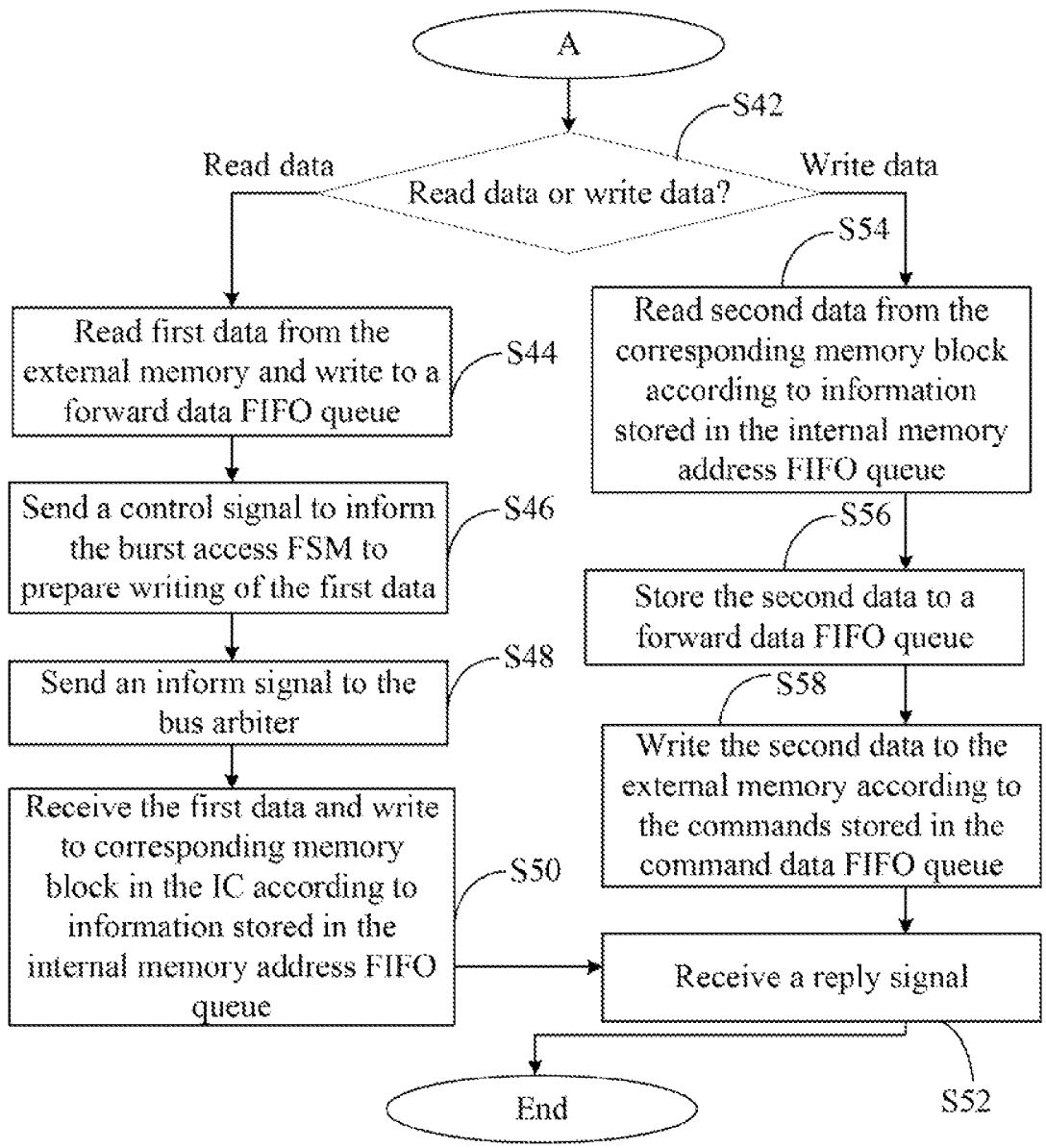

FIG. 3A and FIG. 3B are flowcharts of one embodiment of an external memory access method. Depending on the embodiment, additional blocks may be added, others removed, and the ordering of the blocks may be changed.

In block S30, the bus arbiter 210 receives a request to read data from or write data to the external memory 40 from the one or more function modules 100.

In block S32, the strobe pin 211 informs the external memory controller 30 of the request by sending a preparation signal to the burst access FSM 221.

In block S34, the command pin 212 sends a command signal about the request to the burst access FSM 221. As mentioned above, the command signal includes an operation type, one or more commands, and a communication address of the external memory 40. Depending on the embodiment, the operation type may be read data or write data to the external memory 40. The command signal may include only one command, or include a plurality of commands, such as "'set length=100' & 'read'," which indicate the presence of one hundred consecutive read commands.

In block S36, the burst access FSM 221 stores the commands into the command data FIFO queue 222.

In block S38, the internal memory address out pin 213 sends an internal memory address signal corresponding to the command signal to the burst access FSM 221. As mentioned above, the internal memory address signal includes internal memory address information of the IC 10, such as a memory block 110 to which the read data is stored or from which the writing data is read. For example, if the command signal includes a plurality of consecutive read commands, such as "'set length=100' & 'read'," the internal memory address signal of "addr_[a]" targets a begin address in the memory block 110 for storing data obtained according to the plurality of consecutive read commands.

In block S40, the burst access FSM 221 stores the internal memory address information into the internal memory address FIFO queue 223.

In block S42, the burst access FSM 221 detects the operation type of the command signal is read data or write data. If the operation type is read data, the procedure goes to block S44. Otherwise, if the operation type is write data, the procedure goes to block S54.

In block S44, the burst access FSM 221 directs the external memory controller 30 to read first data from the external memory 40 according to the commands in the command data FIFO queue 222, and stores the first data into the backward data FIFO queue 224.

In block S46, the external memory controller 30 sends a control signal to direct the burst access FSM 221 to prepare writing of the first data to the memory block 110.

In block S48, after receiving the control signal, the burst access FSM 221 transmits an inform signal to the internal memory write enable pin 214.

In block 50, the backward data pin 215 receives the first data from the backward data FIFO queue 224, and the internal memory address in pin 216 writes the first data to a corresponding address in the memory block 110 according to information stored in the internal memory address FIFO queue 223.

In block 52, the acknowledgement pin 218 receives a reply signal sent by the burst access FSM 221 after the burst access FSM 221 has completed operations to the external memory 40.

In block 54, the internal memory address in pin 216 reads second data from a corresponding address in the memory block 110, according to the internal memory address information into the internal memory address FIFO queue 223.

In block 56, the forward data pin 217 stores the second data into the forward data FIFO queue 225.

In block 58, the burst access FSM 221 writes the second data stored in the data FIFO queue 225 to the external memory 40, according to the commands stored in the command data FIFO queue 222 via the external memory controller 30. The procedures then goes to block 52 as described above.

For full utilization of bandwidth of the external memory 40, the signal relay device 20 described above uses the bus arbiter 210 to grant ownership of the bus 23 based on an arbitration mechanism. The hosting function memory 110 may transmit a large group of read/write commands to the burst access engine 220 via the set of pins. The burst access engine 220 uses the burst access FSM 221 to exchange signals with the bus arbiter 210 and the external memory controller 30, and uses four FIFO queues to store different information related to the large group of write/read commands.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A signal relay device for connecting an integrated circuit (IC) to an external memory controller, the external memory controller connecting with an external memory, the IC comprising one or more function modules and one or more memory blocks, and the signal relay device comprising a bus arbiter and a burst access engine connected to the bus arbiter, wherein:
the signal relay device uses the bus arbiter to grant ownership of a bus based on an arbitration mechanism;
a hosting function memory transmits a command signal and a corresponding internal memory address signal to the burst access engine via the arbiter; and
the burst access engine uses a burst access finite state machine (FSM) to exchange signals with the bus arbiter and the external memory controller, and uses four first in first out (FIFO) queues to store different information related to the command signal and the internal memory address signal.

2. The signal relay device as claimed in claim 1, wherein the IC is a processor, an audio device, or a video device.

3. The signal relay device as claimed in claim 1, wherein the external memory is a hard disk, a floppy disk, or an optical disk.

4. The signal relay device as claimed in claim 1, wherein the command signal comprises an operation type, one or more commands, and a communication address of the external memory.

5. The signal relay device as claimed in claim 4, wherein the operation type is read data or write data.

6. The signal relay device as claimed in claim 5, wherein the bus arbiter comprises:
   a strobe pin configured for sending a preparation signal to the external memory controller via the burst access engine, to inform the external memory of the operation;
   a command pin configured for sending the command signal to the burst access engine; and
   an internal memory address out pin configured for sending the internal memory address signal to the burst access engine; wherein:
   the external memory controller reads first data from the external memory according to the command signal, and sends a control signal to inform the burst access engine to prepare writing of the first data to the corresponding memory block in the IC; and the burst access engine generates an inform signal after receiving the control signal;
   wherein the bus arbiter further comprises:
   an internal memory write enable pin configured for receiving the inform signal sent by the burst access engine;
   a backward data pin configured for receiving the first data read from the external memory; and
   an internal memory address in pin configured for writing the first data to the corresponding memory block according to the internal memory address signal, upon the condition that the internal memory write enable pin receives the inform signal.

7. The signal relay device as claimed in claim 6, wherein:
   the internal memory address in pin is further configured for reading second data from the corresponding memory block according to the internal memory address signal, upon the condition that the internal memory write enable pin does not receive the inform signal; and
   the burst access engine is further configured for writing the second data to the external memory according to the command signal via the external memory controller.

8. The signal relay device as claimed in claim 6, wherein:
   upon the condition that the command signal comprises multiple commands, the internal memory address signal comprises a begin address of the corresponding memory block.

9. The signal relay device as claimed in claim 6, wherein:
   the FSM is configured for receiving the control signal sent by the external memory controller, receiving the command signal sent by the command pin, receiving the internal memory address signal sent by the internal memory address out pin, reading the first data from the external memory according to the command signal data, and generating and sending the inform signal based on the control signal; and the four FIFO queues of the burst access engine comprise:
   a command data first in first out (FIFO) queue configured for storing commands contained in the command signal;
   an internal memory address FIFO queue configured for storing internal memory address information contained in the internal memory address signal; and
   a backward data FIFO for storing the first data read from the external memory.

10. The signal relay device as claimed in claim 9, wherein the four FIFO queues the burst access engine further comprise a forward data FIFO queue for storing the second data read from the memory block.

11. The signal relay device as claimed in claim 10, wherein the burst access engine further comprises an acknowledgement pin for receiving a reply signal sent by the burst access FSM after the burst access FSM has completed reading from or writing to the external memory.

12. A method for accessing an external memory utilizing a signal relay device, the method comprising:
   connecting an integrated circuit (IC) to an external memory controller via the signal relay device, wherein the external memory controller is connected with the external memory, the IC comprises one or more function modules and one or more memory blocks, and the signal relay device comprises a bus arbiter and a burst access engine connected with the bus arbiter;
   transmitting a command signal and a corresponding internal memory address signal to the burst access engine via the arbiter; and
   using a burst access finite state machine (FSM) of the burst access engine to exchange signals with the bus arbiter and the external memory controller, and using four first in first out (FIFO) queues of the burst access engine to store different information related to the command signal and the internal memory address signal.

13. The method as claimed in claim 12, wherein the IC is a processor, an audio device, or a video device, and the external memory is a hard disk, a floppy disk, or an optical disk.

14. The method as claimed in claim 12, wherein the command signal comprises an operation type, one or more commands, and a communication address of the external memory.

15. The method as claimed in claim 14, wherein: upon the condition that the command signal comprises multiple commands, the internal memory address signal comprises a begin address of a corresponding memory block.

16. The method as claimed in claim 14, wherein the operation type is read or write data.

17. The method as claimed in claim 16, wherein the bus arbiter comprises a strobe pin, a command pin, and an internal memory address out pin, and wherein transmitting a command signal and a corresponding internal memory address signal to the burst access engine via the arbiter comprises:
   sending a preparation signal to the burst access engine via the strobe pin, to inform the external memory of the operation via the burst access engine;
   sending the command signal to the burst access engine via the command pin; and
   sending the corresponding internal memory address signal to the burst access engine via the internal memory address out pin.

18. The method as claimed in claim 17, wherein the bus arbiter further comprises an internal memory write enable pin, a backward data pin and an internal memory address in pin, and four FIFO queues of the burst access engine comprise a command data first in first out (FIFO) queue, an internal memory address FIFO queue and a forward data FIFO queue, and wherein using a burst access finite state machine (FSM)

of the burst access engine to exchange signals with the bus arbiter and the external memory controller, and using four first in first out (FIFO) queues of the burst access engine to store different information related to the command signal and the internal memory address signal comprise:

storing commands contained in the command signal to the command data FIFO queue via the burst access FSM;

storing internal memory address information contained in the corresponding internal memory address signal to the internal memory address FIFO queue via the burst access FSM;

reading first data from the external memory according to the commands stored in the command data FIFO queue, and storing the first data to the forward data FIFO queue;

sending a control signal to inform the burst access FSM to prepare writing of the first data to corresponding memory block in the IC by the external memory controller, receiving an inform signal sent by the burst access FSM via the internal memory write enable pin, receiving the first data stored in the command data FIFO queue via the backward data pin, and writing the first data to the corresponding memory block according to the internal memory address information stored in the internal memory address FIFO queue.

19. The method as claimed in claim 18, wherein the bus arbiter further comprises a forward data pin, and the four FIFO queues of the burst access engine further comprise a forward data FIFO queue, and wherein using a burst access finite state machine (FSM) of the burst access engine to exchange signals with the bus arbiter and the external memory controller, and using four first in first out (FIFO) queues of the burst access engine to store different information related to the command signal and the internal memory address signal further comprise:

reading second data from the corresponding memory block via the internal memory address in pin according to the internal memory address information stored in the internal memory address FIFO queue, upon the condition that the internal memory write enable pin does not receive the inform signal;

storing the second data to the forward data FIFO queue via the forward data pin; and writing the second data to the external memory via the burst access FSM and the external memory controller, according to the commands stored in the command data FIFO queue.

20. The method as claimed in claim 19, wherein the bus arbiter further comprises an acknowledgement pin, and using a burst access finite state machine (FSM) of the burst access engine to exchange signals with the bus arbiter and the external memory controller further comprises receiving a reply signal sent by the burst access FSM after the burst access FSM has completed reading from or writing to the external memory.

* * * * *